(No Model.)
J. JOHNSON.
VEHICLE TONGUE SUPPORT.
No. 507,136. Patented Oct. 24, 1893.
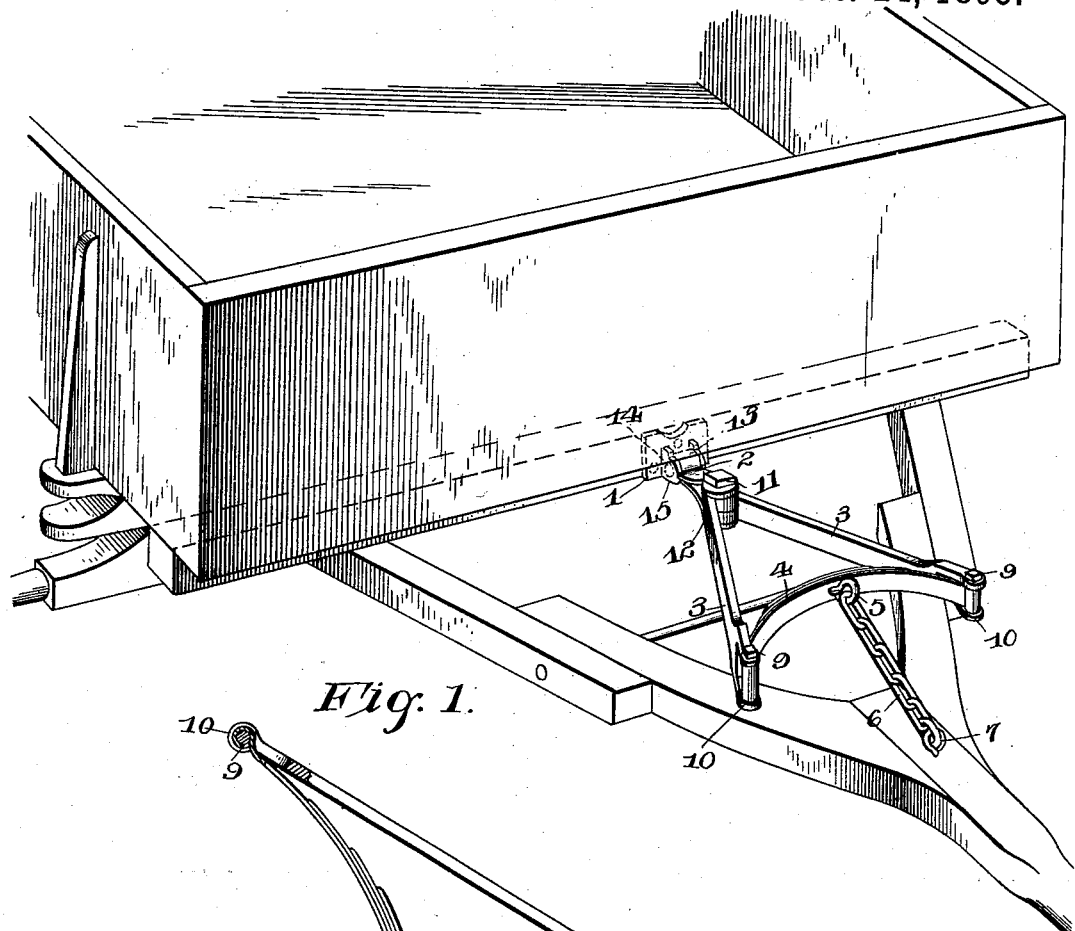
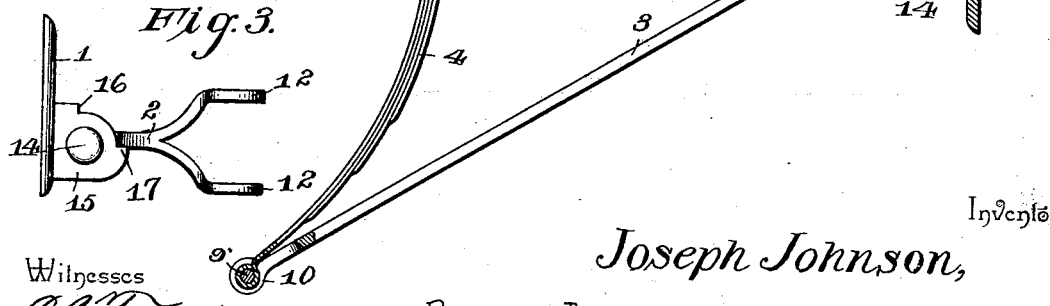
Witnesses
C. A. Ford
N. F. Riley
Inventor
Joseph Johnson,
By his Attorneys.
C. A. Snow & Co.

UNITED STATES PATENT OFFICE.

JOSEPH JOHNSON, OF MINNEAPOLIS, MINNESOTA, ASSIGNOR OF ONE-HALF TO MYRON W. SMADES, OF SAME PLACE.

VEHICLE-TONGUE SUPPORT.

SPECIFICATION forming part of Letters Patent No. 507,136, dated October 24, 1893.

Application filed June 28, 1893. Serial No. 479,058. (No model.)

*To all whom it may concern:*

Be it known that I, JOSEPH JOHNSON, a citizen of the United States, residing at Minneapolis, in the county of Hennepin and State of Minnesota, have invented a new and useful Shaft-Support, of which the following is a specification.

The invention relates to improvements in supports for poles and shafts.

The object of the present invention is to provide a simple and inexpensive support for poles and shafts adapted to be readily applied to a vehicle and capable of holding shafts and poles up from the ground to prevent the same being broken or otherwise injured by horses or other draft-animals, and to keep the weight of the pole or shafts from the animals.

The invention consists in the construction and novel combination and arrangement of parts hereinafter fully described, illustrated in the accompanying drawings, and pointed out in the claims hereto appended.

In the drawings: Figure 1 is a perspective view of a support constructed in accordance with this invention and shown applied to a vehicle. Fig. 2 is a plan view of the support detached, the joints being in section. Fig. 3 is a detail view of the attachment plate and the coupling link.

Similar numerals of reference indicate corresponding parts in the several figures of the drawings.

1 designates an attachment-plate designed to be secured to a wagon bed, spring bar or head-block, and having connected with it, by a coupling-link 2, divergent side-bars 3, which have their front ends connected to a transversely-disposed semi-elliptic leaf-spring 4. The transverse spring is provided with a central eye-bolt 5, and is connected by a chain 6 with an eye-bolt 7 of a pole or shafts; and the ends of the spring are provided with eyes and are pivoted by vertical bolts 9 to the front ends 10 of the side-bars in bifurcations thereof. The front ends of the side-bars are provided with perforations to receive the pivot-bolts 9, and the spring, which is curved inward between the side-bars, has its ends hingedly connected therewith.

The rear or upper ends of the diverging side-bars are provided with eyes or knuckles and are pivoted by a bolt 11, in a vertical fork 12, at the front end of the coupling-link 2. The rear end of the coupling-link is provided with a horizontal eye 13, and is pivoted or hinged by a horizontal bolt 14, between forwardly-extending perforated ears or flanges 15, of the attachment-plate 1. The link which couples the diverging bars to the attachment-plate permits the body of the support to swing vertically and horizontally to enable the vehicle to turn freely without straining the support, and the joints at the ends of the side-bars 3, relieve the spring of any unnecessary pressure and at the same time maintain the spring in a line with a pole or shafts when the vehicle is making a short turn.

It will be seen that the shaft and pole support is simple and inexpensive in construction, that it is strong and durable, and that it is adapted to be readily applied to any ordinary vehicle, and that when it is applied it is capable of holding the pole or shafts thereof in an elevated position to prevent them being stepped on and broken or otherwise injured by the draft-animals. It will also be apparent that the support is adapted to sustain the weight of a pole or shafts to relieve the draft-animal or animals of the same.

Changes in the form, proportion, and the minor details of construction may be resorted to without departing from the principle or sacrificing any of the advantages of this invention.

The forwardly-projecting ears 15 are recessed at their upper and front edges to form upper and lower shoulders 16 and 17, between which the link 2 is adapted to swing to permit a tongue or shafts to be elevated out of the way; and the lower shoulders 17 are adapted to support the weight of the body of the support to prevent it swinging downward.

I do not wish to be understood as limiting myself to the use of a flat spring, as 4, but may, when occasion requires, substitute in lieu thereof a coiled spring.

What I claim is—

1. A shaft and pole support comprising diverging side-bars hingedly connected at their adjacent ends, a transverse spring hingedly connected to the outer ends of the side-bars, and means for connecting the side-bars and spring with the body and the shafts or pole of a vehicle, substantially as described.

2. A shaft and pole support comprising diverging side-bars having their adjacent ends hingedly connected, a transverse spring connected to the outer ends of the side-bars, and means for connecting the side-bars and the spring with the body and the shafts or pole of a vehicle, substantially as described.

3. A support for poles and shafts comprising diverging side-bars having their adjacent ends hingedly connected, a transversely-disposed semi-elliptic spring curved inward between the side-bars and hingedly connected to the outer ends of the same, and means for connecting the side-bars and the spring with the body and the pole or shafts of a vehicle, substantially as described.

4. A shaft and pole support composed of diverging side-bars having their adjacent ends hingedly connected, a transversely disposed spring hingedly connected to the outer ends of the side-bars and extending between the same and provided with an eye designed to be connected with a pole or shafts, a securing-plate adapted to be attached to the body of a vehicle and provided with forwardly-projecting ears, a coupling-link provided at its front end with a vertical fork and having the connected ends of the side-bars hinged therein, and a horizontal bolt passing through the ears and the rear end of the coupling-link and hinging the latter to the securing-plate, substantially as described.

5. A shaft and pole support comprising a securing plate having forwardly-projecting ears provided with supporting shoulders, a coupling link hinged between the ears and adapted to rest upon the shoulders, and a body portion connected to the coupling link and provided with a spring, substantially as described.

6. A shaft and pole support comprising the link 2 pivotally mounted on the front end of the wagon box or other fixed part of a vehicle, the body-portion hinged to the link at right angles to the line of movement of the link, and a spring connection between the body-portion and the tongue, substantially as described.

In testimony that I claim the foregoing as my own I have hereto affixed my signature in the presence of two witnesses.

JOSEPH JOHNSON.

Witnesses:
 M. W. SMADES,
 GEORGE HUHN.